(No Model.)
A. E. PUTNAM.
BICYCLE HOLDER.
No. 572,770. Patented Dec. 8, 1896.
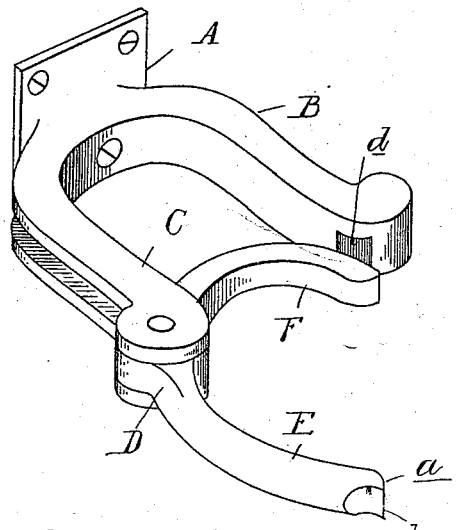
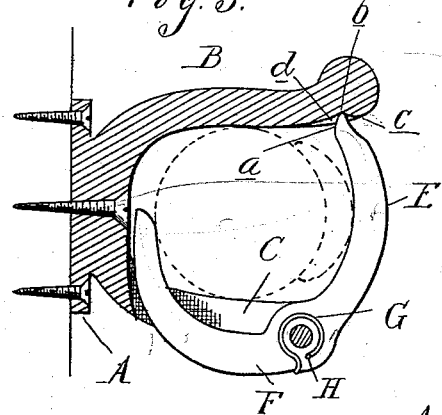
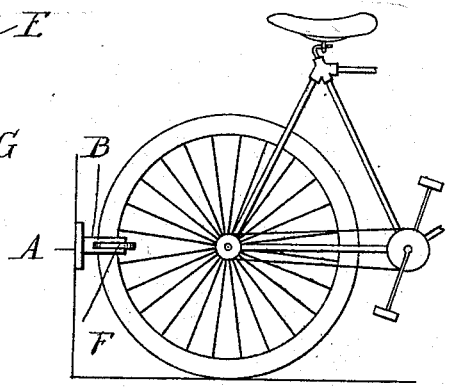
Witnesses
A. L. Hobby
O. F. Bartlett
Inventor
Alfred E. Putnam
By Thos. S. Sprague & Son, Atty's

United States Patent Office.

ALFRED E. PUTNAM, OF MILAN, MICHIGAN.

BICYCLE-HOLDER.

SPECIFICATION forming part of Letters Patent No. 572,770, dated December 8, 1896.

Application filed March 28, 1896. Serial No. 585,169. (No model.)

*To all whom it may concern:*

Be it known that I, ALFRED E. PUTNAM, a citizen of the United States, residing at Milan, in the county of Washtenaw and State of Michigan, have invented certain new and useful Improvements in Bicycle-Holders, of which the following is a specification, reference being had therein to the accompanying drawings.

The invention consists in the construction of a bicycle-holder comprising a substantially U-shaped bracket and a bifurcated or C-shaped locking member pivoted in the outer end thereof so arranged that as the wheel of a bicycle is moved in between the arms of the U-shaped bracket the locking member is turned into its locked position and is drawn or thrown to its open position as the bicycle-wheel is retracted, as more fully hereinafter described.

The invention further consists in the combination, arrangement, and construction of the device, as more fully hereinafter described and claimed.

In the drawings, Figure 1 is a side elevation showing my device as in use for holding the rear wheel of a bicycle. Fig. 2 is a detached perspective view of the holder. Fig. 3 is a horizontal section through the device, showing in dotted lines a section through the wheel-tire.

A is a plate by means of which the device may be secured in position upon a suitable wall or to the inclined block secured to the wall if it is desired to have an angular arrangement of the wheels. From this projects (preferably integral therewith) the U-shaped bracket B. The arm C of this bracket is bifurcated, and at the outer end, between the bifurcations, is pivoted the bifurcated locking member D, which comprises the locking-arm E and the actuating-arm F. This locking member has a suitable spring acting to hold it normally in its open position, as shown in Fig. 2.

The spring I have shown consists of a spirally-arranged spring-wire G, engaging in a groove in the face of the hub of a locking member and having a pivot portion H engaged in an aperture in the inner face of the bifurcation of the arm C of the bracket. Any other suitable spring may be employed.

The end of the locking-arm E is provided with a bevel $a$ and the point $b$. The bevel $a$ is adapted to strike the bevel $c$ on the opposite arm of the bracket B as it is moved inward and the point is adapted to lock in the notch $d$ therein, there being sufficient spring in the parts to permit of this engagement.

The parts being in the position shown in Fig. 2, the operator rolls his wheel up to the bracket and causes the tire to strike the actuating-arm F, which turns the locking member on its pivot against the tension of the spring, and by a quick push inward of the wheel forces the point $b$ into the notch $d$, which locks the wheel in position, the locking member being turned on its pivot by the impact of the tire against the arm F. To release the wheel, the operator simply draws backward upon it sufficient to overcome the frictional engagement of the point $b$ in the notch $d$, when the outward movement will rock the locking member into the position shown in Fig. 2, in which position it will be held by the tension of the spring.

In place of the point $b$ and notch $d$ any other suitable locking device may be employed. For instance, a lock requiring a key may be applied, if necessary, and as any suitable spring-latch lock may be employed I do not deem it necessary to illustrate that feature of my invention.

What I claim as my invention is—

A bicycle-holder comprising a substantially U-shaped bracket, a bifurcated locking member pivoted in one arm of the bracket, a spring acting to normally hold the locking member open, the point $b$ on the locking-arm of the locking member and the notch $d$ in the outer end of the opposite arm of the bracket with which the point is adapted to engage to hold the locking member closed, substantially as described.

In testimony whereof I affix my signature in presence of two witnesses.

ALFRED E. PUTNAM.

Witnesses:
M. B. O'DOGHERTY,
O. F. BARTHEL.